(12) United States Patent
McDowell (10) Patent No.: US 12,134,307 B2
(45) Date of Patent: Nov. 5, 2024

(54) MAGNETIC HAIL RESISTANT MATS

(71) Applicant: Robert Dewitt McDowell, Arcadia, LA (US)

(72) Inventor: Robert Dewitt McDowell, Arcadia, LA (US)

(*) Notice: Subject to any disclaimer, the term of this patent is extended or adjusted under 35 U.S.C. 154(b) by 323 days.

(21) Appl. No.: 17/875,072

(22) Filed: Jul. 27, 2022

(65) Prior Publication Data
US 2024/0034135 A1   Feb. 1, 2024

(51) Int. Cl.
*B60J 11/06* (2006.01)
*B60N 3/04* (2006.01)
*B60R 13/01* (2006.01)

(52) U.S. Cl.
CPC .............. *B60J 11/06* (2013.01); *B60N 3/044* (2013.01); *B60N 3/046* (2013.01); *B60N 3/048* (2013.01); *B60R 13/01* (2013.01); *B60R 2013/016* (2013.01)

(58) Field of Classification Search
CPC .......... B60N 3/04; B60N 3/044; B60N 3/046; B60N 3/048; B60R 13/01; B60R 13/011; B60R 13/016; B60R 13/018
USPC ...... 296/97.23, 136.01, 2, 7, 8, 1, 12, 13, 11
See application file for complete search history.

(56) References Cited

U.S. PATENT DOCUMENTS

| | | | |
|---|---|---|---|
| 3,930,084 A * | 12/1975 | Shields | B44C 1/26 156/303.1 |
| 7,100,965 B1 | 9/2006 | Stover | |
| 11,678,757 B2 * | 6/2023 | Puthillath | D06N 7/0068 428/95 |
| 2003/0024195 A1 * | 2/2003 | Koh | B60R 13/01 52/506.01 |
| 2003/0138620 A1 * | 7/2003 | Fonseca | B32B 7/12 428/317.1 |
| 2022/0185161 A1 | 6/2022 | McDowell | |

FOREIGN PATENT DOCUMENTS

JP    2012-188056   * 10/2012

OTHER PUBLICATIONS

JP2012-188056 Text.*

* cited by examiner

*Primary Examiner* — Dennis H Pedder
(74) *Attorney, Agent, or Firm* — Goodhue, Coleman & Owens, P.C.

(57) ABSTRACT

A vehicle mat is configured to prevent hail damage to a body of a vehicle. The vehicle mat may include a vehicle mat body having a plurality of layers including a top layer and a bottom layer. The top layer may be formed of a hail resistant material. The bottom layer may be formed of a flexible magnetic substrate. The flexible magnetic substrate provides sufficient holding strength to magnetically couple the vehicle mat to a vehicle body and maintain the vehicle mat in place during a hail event to thereby assist in preventing hail damage to the vehicle.

20 Claims, 11 Drawing Sheets

MAGNETIC HAIL RESISTANT MATS

RELATED APPLICATIONS

U.S. application Ser. No. 17/120,143 (U.S. 2022/0185161 A1) is a commonly owned related application and is hereby incorporated by reference in its entirety.

BACKGROUND OF THE INVENTION

Hail damage is a significant problem for vehicle owners and their insurers especially in geographic areas where hailstorms are frequent or server. Hail can cause a variety of significant types of damage to vehicle bodies included cosmetic damage and scratched paint.

Hail damage can be avoided by not exposing a vehicle to the elements, but this is not practical as hailstorms can arrive suddenly or at inopportune times where one cannot garage the vehicle or otherwise store the vehicle in a safe place. For example, hail may occur while one is traveling with no nearby covered area to even temporarily park one's vehicle.

What is needed are effective means of protecting vehicles from hail damage.

SUMMARY

Therefore, it is a primary object, feature, or advantage to improve over the state of the art.

It is a further object, feature, or advantage to provide a method and apparatus for preventing hail damage to vehicles.

Another object, feature or advantage is to provide magnetic hail resistant mats for vehicles.

Yet another, object, feature, or advantage is to provide magnetic hail resistant mats which may be used for magnetically coupling to a vehicle body in order to provide protection from hail.

One or more of these and/or other objects, features, or advantages will become apparent from the specification and claims that follow. No single embodiment need provide each and every object, feature, or advantage as different embodiments may have different objects, features, and advantages. The present invention is not to be limited by these objects, features, or advantages.

According to one aspect, a vehicle mat is configured to prevent hail damage to a body of a vehicle. The vehicle mat may include a vehicle mat body having a plurality of layers including a top layer and a bottom layer. The top layer may be formed of a hail resistant material. The bottom layer may be formed of a flexible magnetic substrate. The flexible magnetic substrate provides sufficient holding strength to magnetically couple the vehicle mat to a vehicle body and maintain the vehicle mat in place during a hail event to thereby assist in preventing hail damage to the vehicle. The flexible magnetic substrate may be formed from magnetized polymer composite. The flexible magnetic substrate may provide a pull strength of at least 41.5 g/cm². The vehicle mat may be a vehicle floor mat and the vehicle mat body may be sized and shaped to fit a floorboard of a vehicle. The floorboard may be in a first row of the vehicle, or a second or subsequent row of the vehicle. The vehicle mat may be a vehicle cargo mat and the vehicle mat body may be sized and shaped to fit a cargo area of the vehicle or a trunk area of the vehicle. The top layer of the vehicle may be formed of vinyl. The top layer may include a textured surface. The flexible magnetic substrate may include an elastomeric polymer and a ferrite material formed into a sheet and magnetized. The top layer may be adhered or otherwise connected to the bottom layer.

According to another aspect, a method for preventing hail damage to a vehicle is provided. The method includes providing a vehicle mat configured to prevent hail damage to a body of the vehicle, the vehicle mat comprising: a vehicle mat body having a plurality of layers including a top layer and a bottom layer, the top layer comprised of a hail resistant material, the bottom layer comprised of a flexible magnetic substrate wherein the flexible magnetic substrate provides sufficient holding strength to magnetically couple the vehicle mat to a vehicle body and maintain the vehicle mat in place during a hail event to thereby assist in preventing hail damage to the vehicle. The method further includes removing the vehicle mat from the vehicle prior or during a hailstorm, magnetically coupling the vehicle mat to an exterior of the vehicle body so as to assist in preventing hail damage to the vehicle, and magnetically decoupling the vehicle mat from the exterior of the vehicle body after the hailstorm. The method may further include returning the vehicle into the vehicle. The flexible magnetic substrate may include a magnetized polymer composite. The flexible magnetic substrate has a pull strength of at least 41.5 g/cm². The vehicle mat be a vehicle floor mat and wherein the vehicle mat body is sized and shaped to fit a floorboard of the vehicle. The vehicle mat may be a vehicle cargo mat and wherein the vehicle mat body is sized and shaped to fit a cargo area of the vehicle. The top layer may include vinyl. The top layer may have a textured surface. The flexible magnetic substrate may include an elastomeric polymer and a ferrite material formed into a sheet and magnetized.

According to another aspect, an apparatus for preventing hail damage to automobile panels and other surfaces is provided. The apparatus includes an automotive floor mat, said floor mat further comprising an upper layer and a lower layer, said upper layer being comprised of material capable of preventing hail damage, said lower layer being comprised of magnetic material, said upper layer and said lower layer being formed together so as to created said floor mat, said floor mat being capable of magnetically adhering to said automotive panels and other surfaces, thus preventing hail damage.

DETAILED DESCRIPTION

The present invention relates generally to magnetic hail resistant mats for a vehicle. The mats may be positioned within a vehicle and function as floor mats, cargo mats, or otherwise within the vehicle. The mats may also be removed from the vehicle and magnetically coupled to the exterior of the vehicle in order to protect the vehicle body from hail.

Figure 1A:
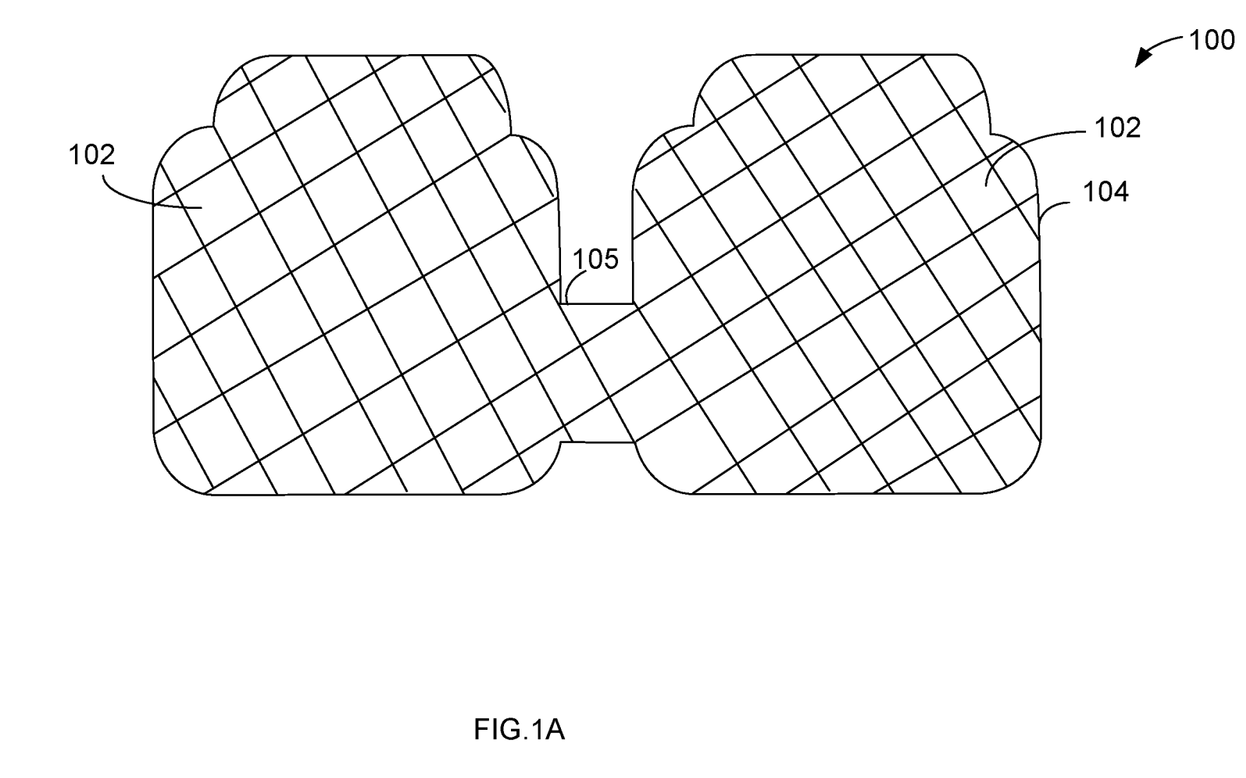
FIG. 1A illustrates a top view of one example of second row vehicle floor mats.
Figure 1B:
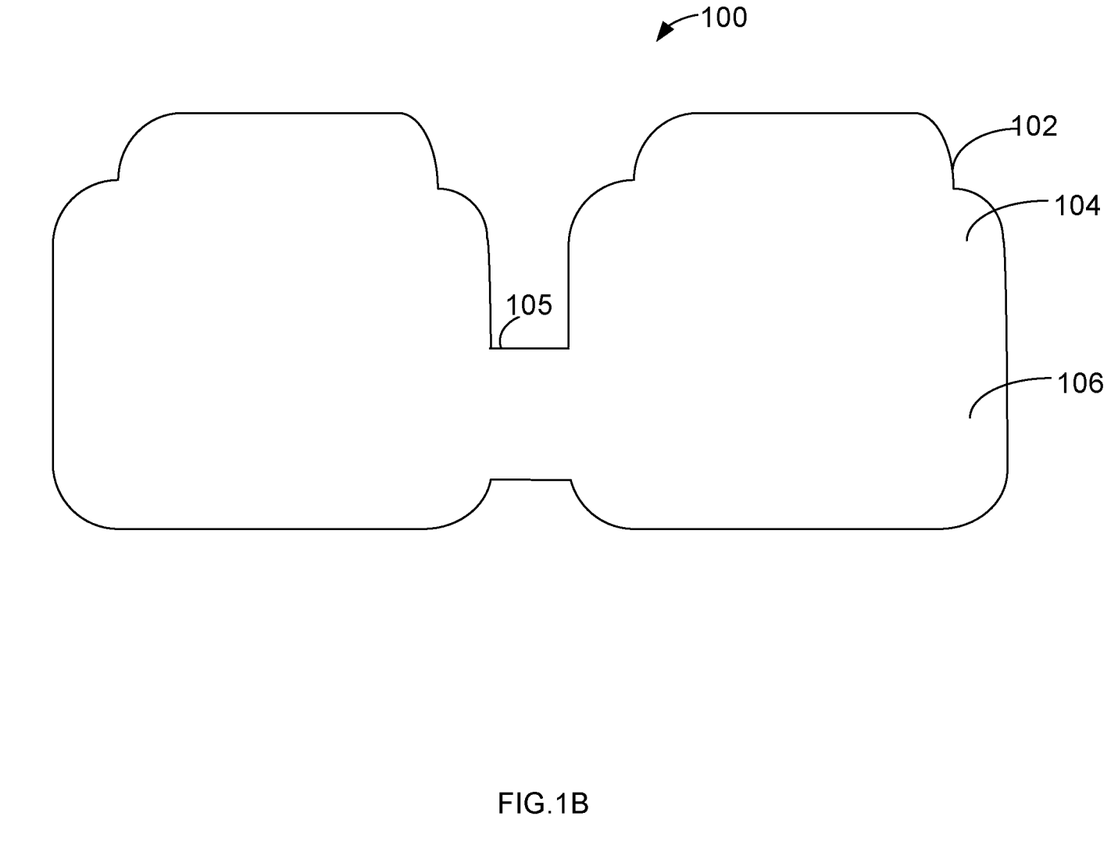
FIG. 1B illustrates a bottom view of the second row vehicle floor mats.

FIG. 1A and FIG. 1B illustrate a set of floor mats 100 such as may be used in a back row of seats in a passenger vehicle. The set of floor mats 100 may include multiple layers including a top layer 102 and a bottom layer 104. Although the particular configuration shown has connecting member 105, the connecting member 105 need not be present and there may be two separate floor mats instead.

The top layer 102 may be formed of any number of materials. In one embodiment, the top layer 102 is formed of vinyl, rubber, or plastic. The top layer 102 may have molded features such as lines or patterns. Such molded features may be useful when the floor mat 100 is used as a floor mat and may provide for traction as well as to enhance aesthetics of the floor mat. Alternatively, the top layer 102 may have a soft material such as cloth or carpeting.

The bottom layer 104 may be a magnetized flexible substrate 106. The magnetized flexible substrate 106 may be formed from composite materials with magnetic components arranged in an elastomer matrix. For example, the magnetized flexible material may include rubber polymer resin and ferrite material which has been formed into a sheet such as through an extrusion process or through a rolling process and then magnetized by applying a magnetic field and laminated with a material such as vinyl.

The thickness of the magnetized flexible substrate 106 may be increased in order to increase its pull strength such as may be needed where the mat is heavier and more likely to peel away from the exterior body of the vehicle. Magnetized vinyl having a thickness of at least 30 mils and a pull strength of at least 41.5 g/cm$^2$ is preferred. However, the specific size, shape, mass, and configuration of the floor mat 100 as well as the composition of the magnetized flexible substrate 106 may result in different thicknesses.

The magnetized flexible substrate is preferably temperature resistant so that they can withstand temperatures encountered without demagnetizing. There is also preferably chemical resistant so that they are resistant to air.

Figure 2:
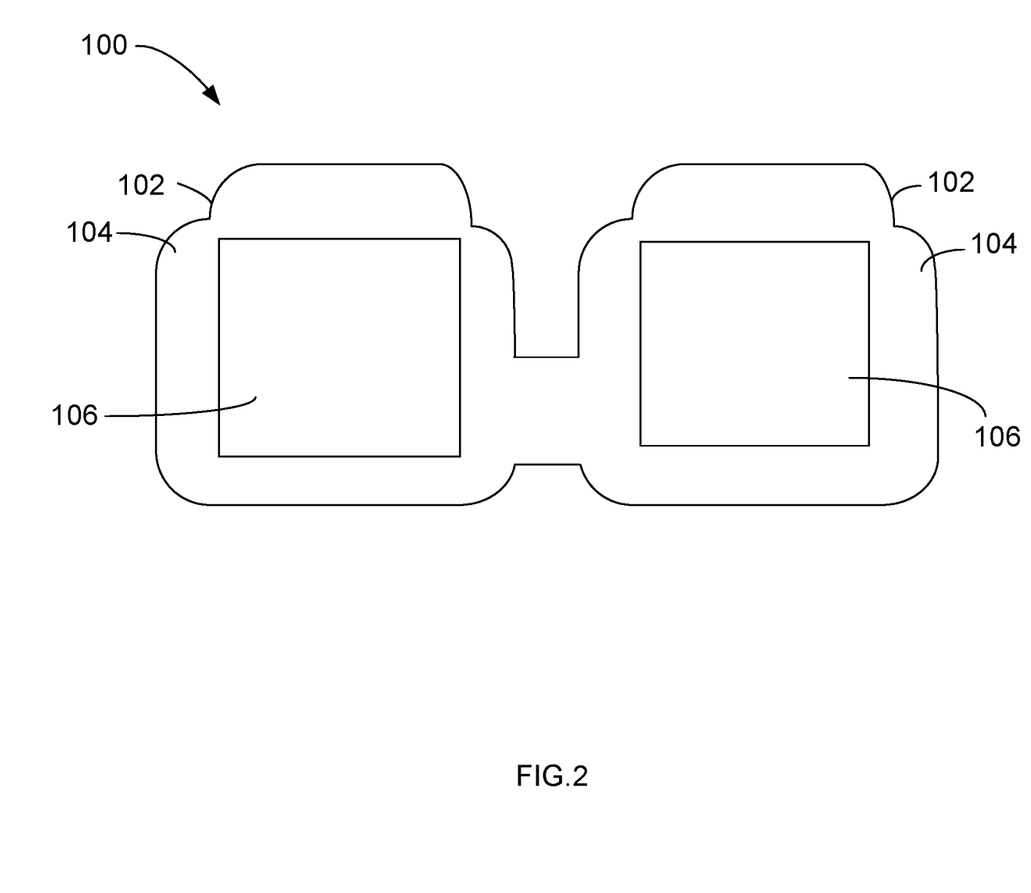
FIG. 2 illustrates a bottom view of an alternative embodiment of the second row vehicle floor mats.

As shown in FIG. 2, in some embodiments, it is contemplated that the magnetized flexible substrate 106 need not form the entire bottom layer 104. Instead, the magnetized flexible substrate 106 may only form a portion of the bottom layer 104. It should be appreciated, however, that any number of different geometries or patterns of the magnetized flexible substrate 106 may be present. For example, a central region including the magnetized flexible substrate 106 may be used as shown. Alternatively, the magnetized flexible substrate may be present in different separate regions, in alternating strips, or otherwise.

Figure 3A:
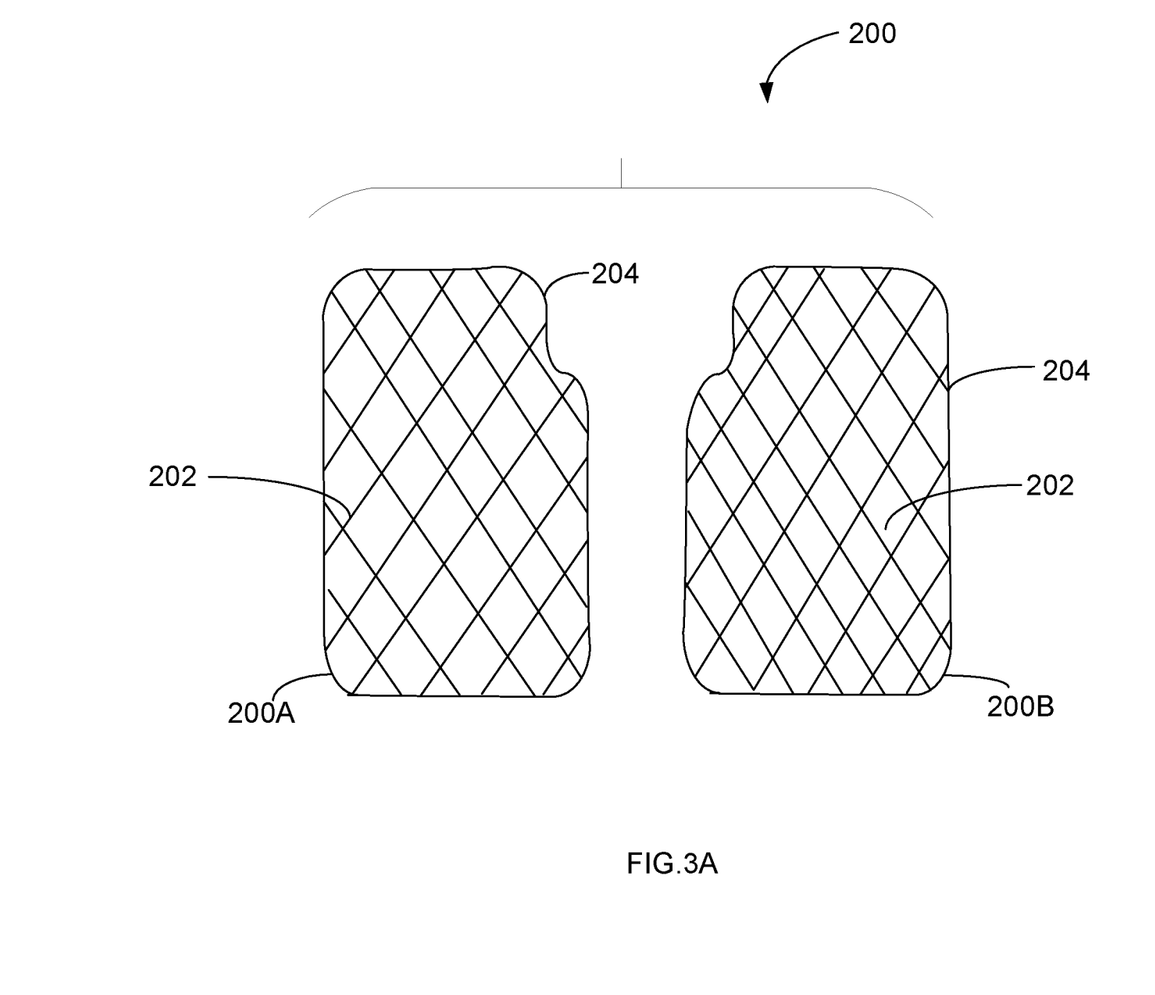
FIG. 3A illustrates a top view of one example of a front row vehicle floor mats.
Figure 3B:
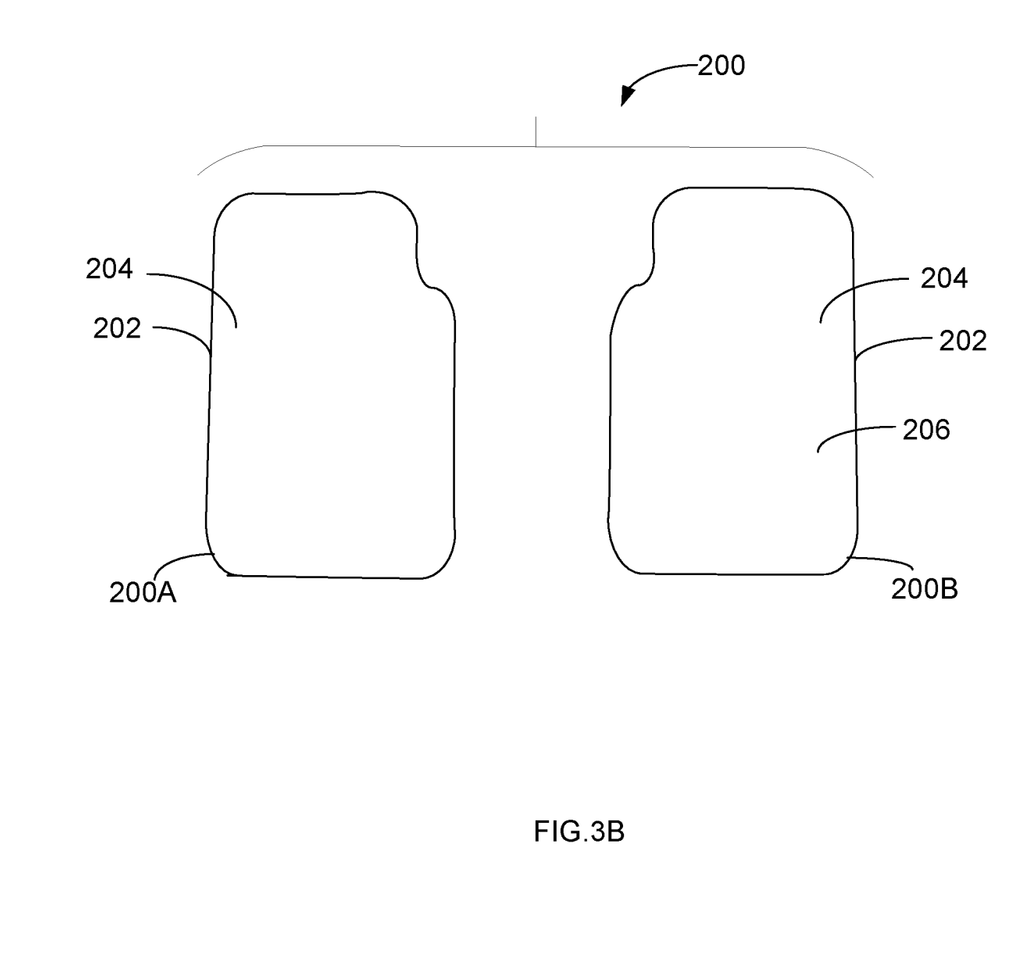
FIG. 3B illustrates a bottom view of the front row vehicle floor mats.

FIG. 3A and FIG. 3B illustrate another example of set of floor mats 200 such as may be used in a floor of front row of a vehicle. The set of floor mats 200 include a left floormat 200A and a right floormat 200B. The set of floor mats 200 are formed with a top layer 202, a bottom layer 204, and a magnetized flexible substrate 206 which may serve as the bottom layer. The shape or configuration of the set of floor mats 200 shown in FIG. 3A and FIG. 3B is such that it may be used in a front floor, however the shape or configuration may vary depending upon the vehicle, or the fit desired.

Figure 4:
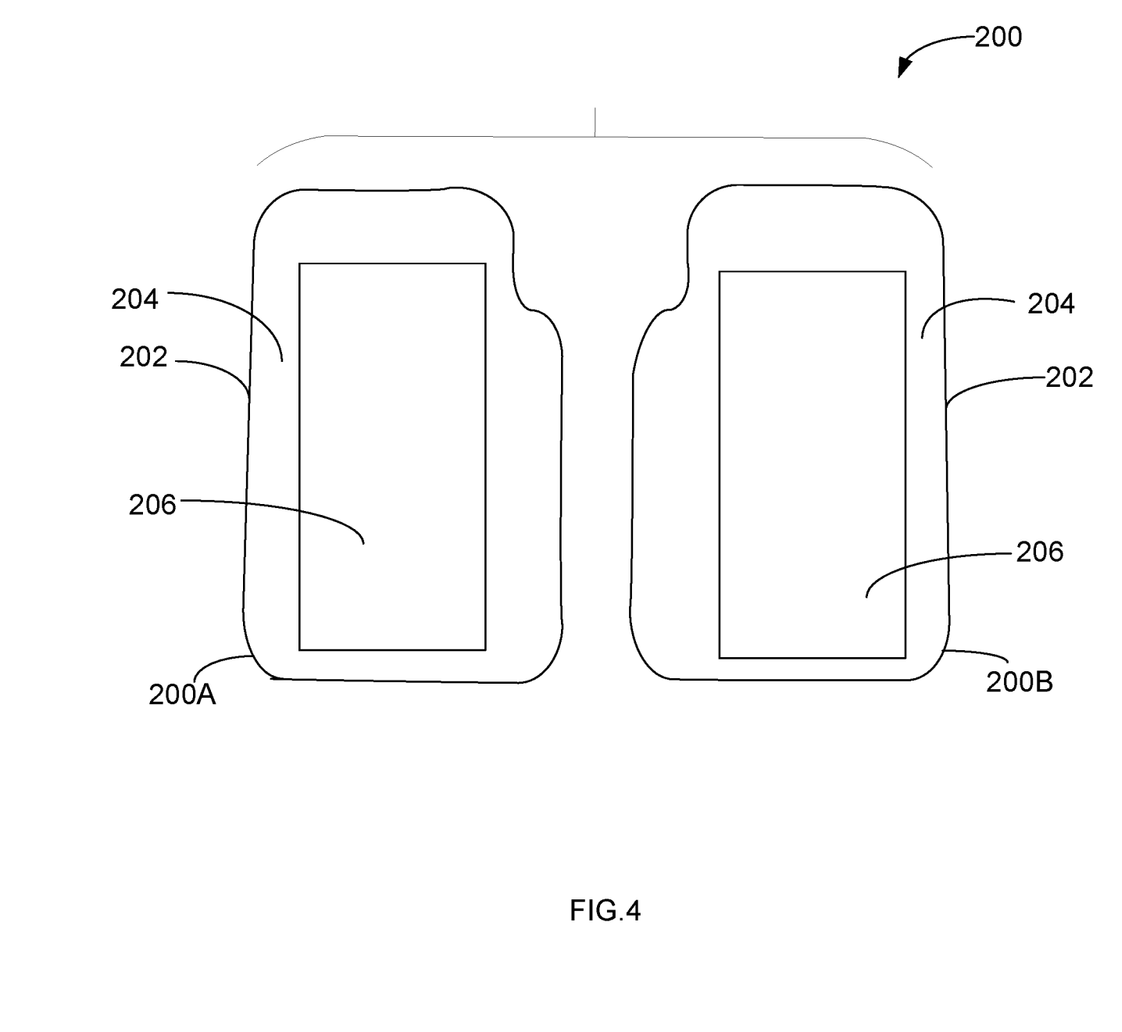
FIG. 4 illustrates a bottom view of an alternative embodiment of the front row vehicle floor mats.

FIG. 4 illustrates that the magnetized flexible substrate 206 need not form the entire bottom layer 204. Instead, the magnetized flexible substrate 206 may only form a portion of the bottom layer 204. t should be appreciated, however, that any number of different geometries or patterns of the magnetized flexible substrate 206 may be present. For example, a central region including the magnetized flexible substrate 206 may be used as shown. Alternatively, the magnetized flexible substrate may be present in different separate regions, in alternating strips, or otherwise.

Figure 5:
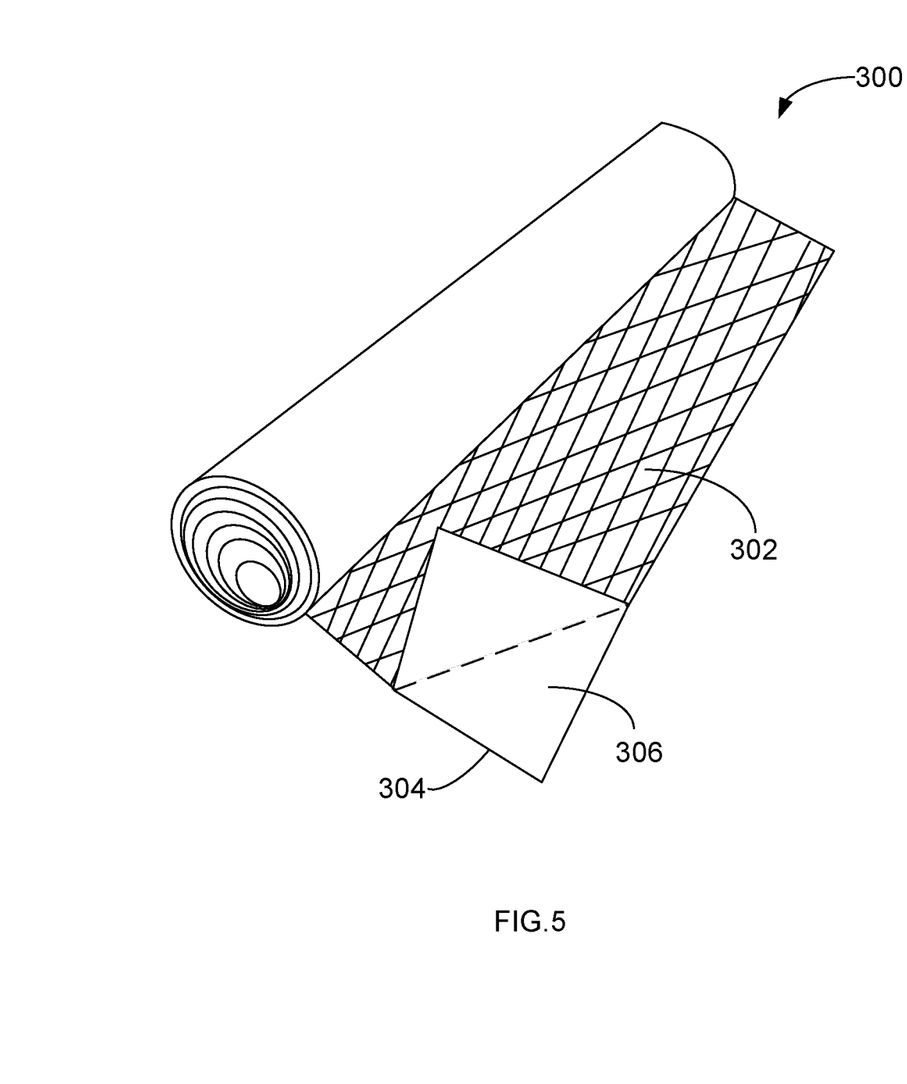
FIG. 5 illustrates a perspective view of a hail resistant magnetic mat such as a hail resistant magnetic vehicle cargo mat.

FIG. 5 illustrates an example of a cargo mat or trunk mat 300. The trunk mat 300 has a top layer 302 and a bottom layer 304. As shown in FIG. 5, the top layer 302 is above the magnetized flexible substrate 306.

The top layer 302 may be formed of any number of materials. In one embodiment, the top layer 302 is formed of vinyl, rubber, or plastic. The top layer 302 may have molded features such as lines or patterns.

Figure 6:
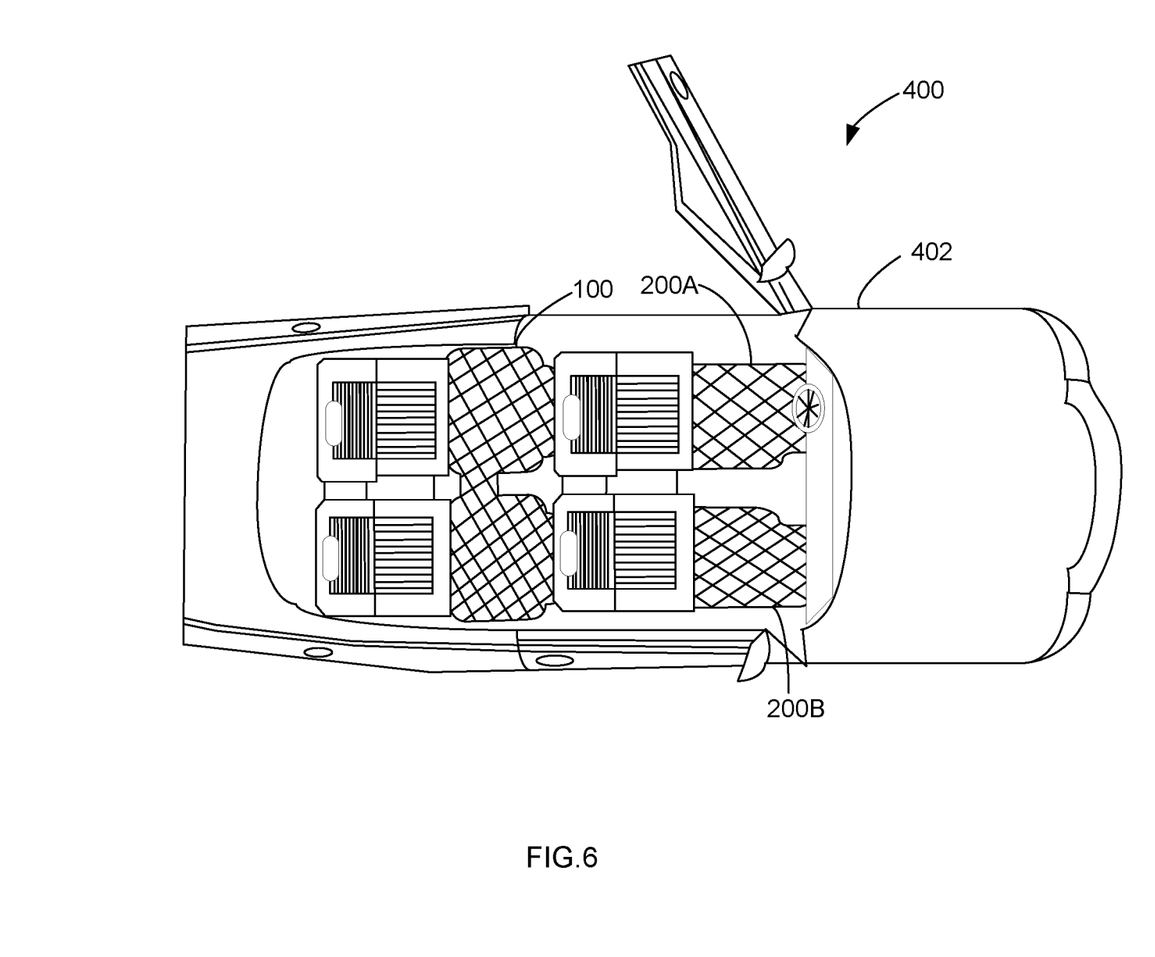
FIG. 6 illustrates one example of a vehicle with the vehicle roof cut away to show the vehicle cabin configuration where first row vehicle floor mats and second row vehicle floor mats are installed.

FIG. 6 illustrates an interior cabin of a vehicle 400 in the form of a sedan with the roof of the car not present. Although a sedan is shown, it is to be understood that any number of other types of vehicles with any number of different configurations may be used instead. The vehicle 400 has an exterior vehicle body 402. As shown, the set of floor mats 100 is positioned on the floor of the back seat or back row and the floor mats 200A, 200B are positioned on the floor of the front seat or first row.

Figure 7:
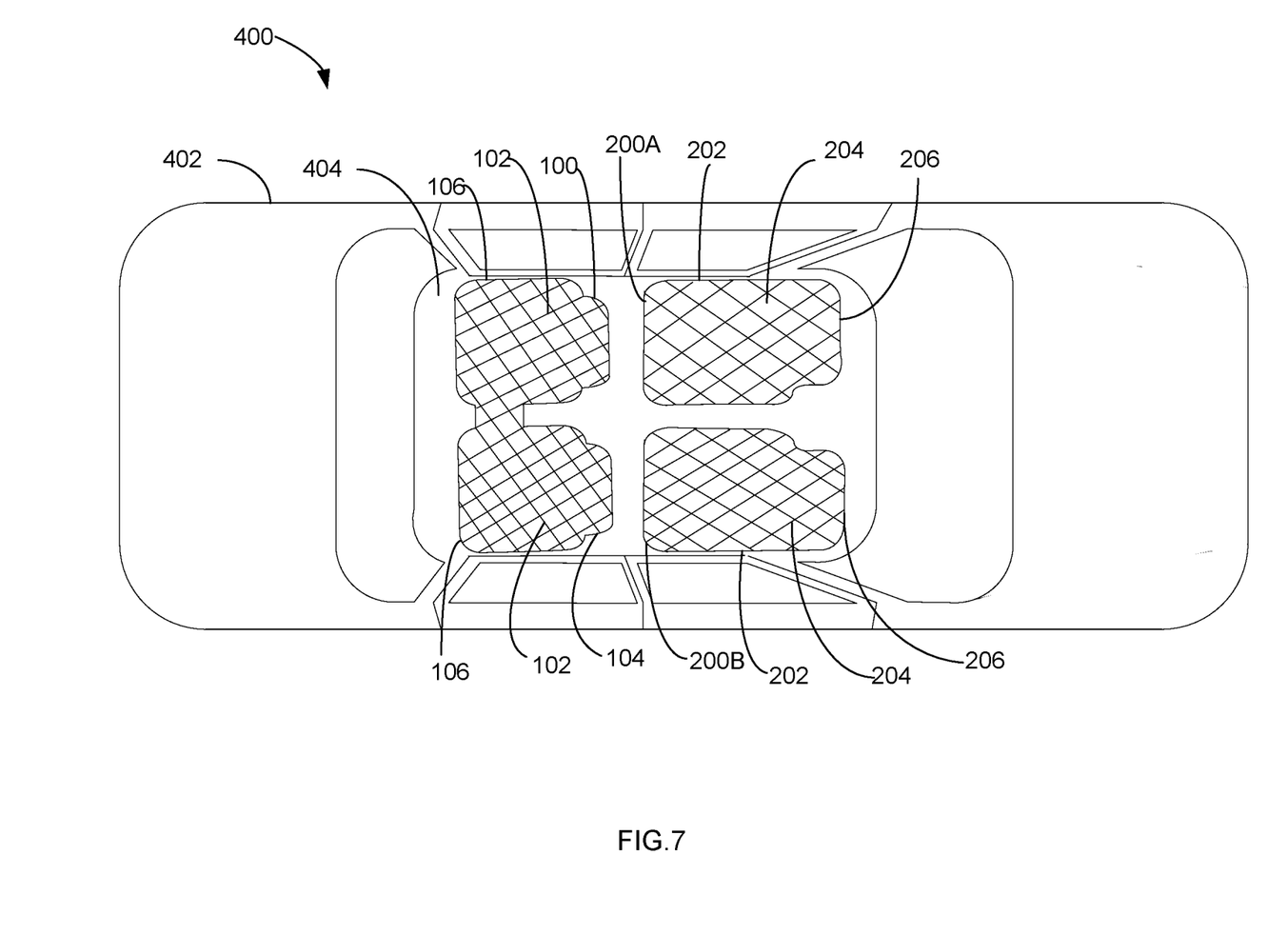
FIG. 7 illustrates a top view of the vehicle with the first row vehicle floor mats and the second row vehicle floor mats magnetically coupled to the roof of the exterior body of the vehicle.

FIG. 7 illustrates the vehicle 400 with the set of floor mats 100 positioned on the roof 404 of the vehicle and the floor mats 200A, 200B also positioned on the roof 404 of the vehicle.

Figure 8:
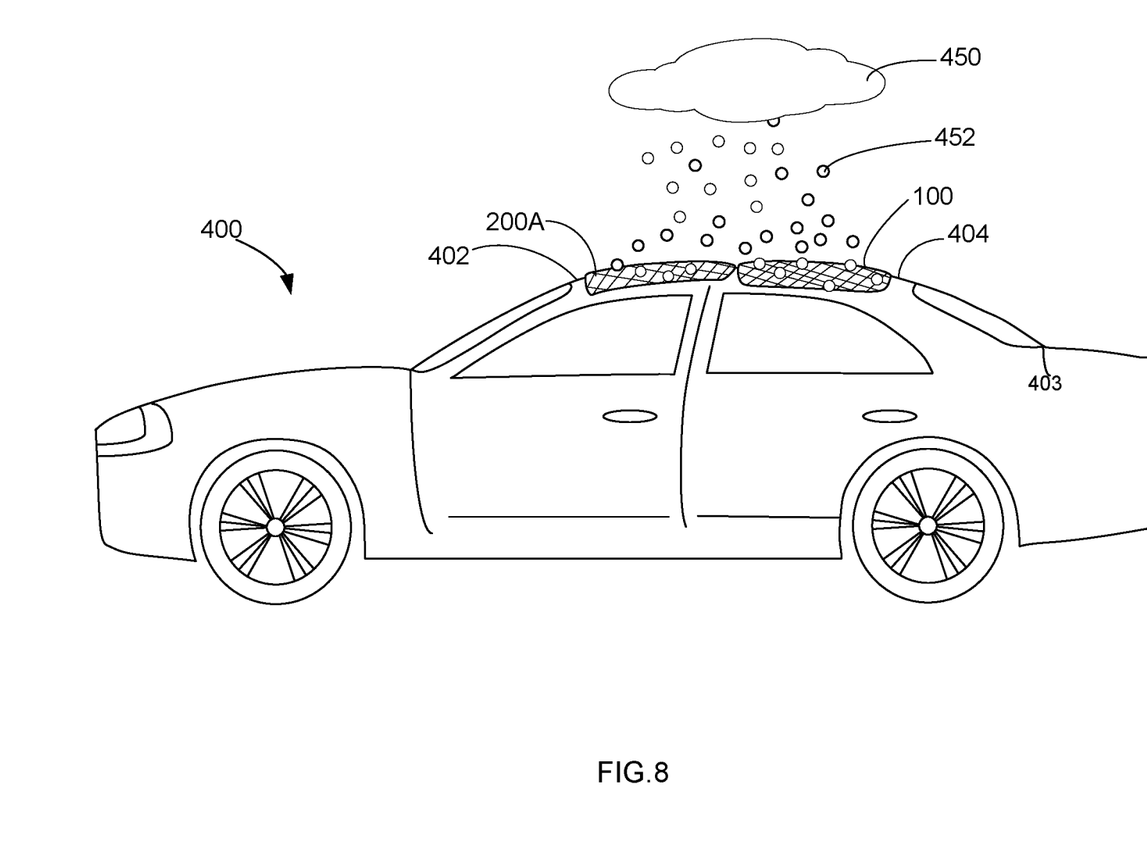
FIG. 8 illustrates the vehicle with the first row vehicle floor mats and the second row vehicle floor mats magnetically coupled to the roof of the exterior body of the vehicle during a hail event.

FIG. 8 illustrates the vehicle 400 with a vehicle body 403 including a vehicle roof 404. The floor mats including 100, 200A, are magnetically coupled to the roof of the car.

Figure 9:
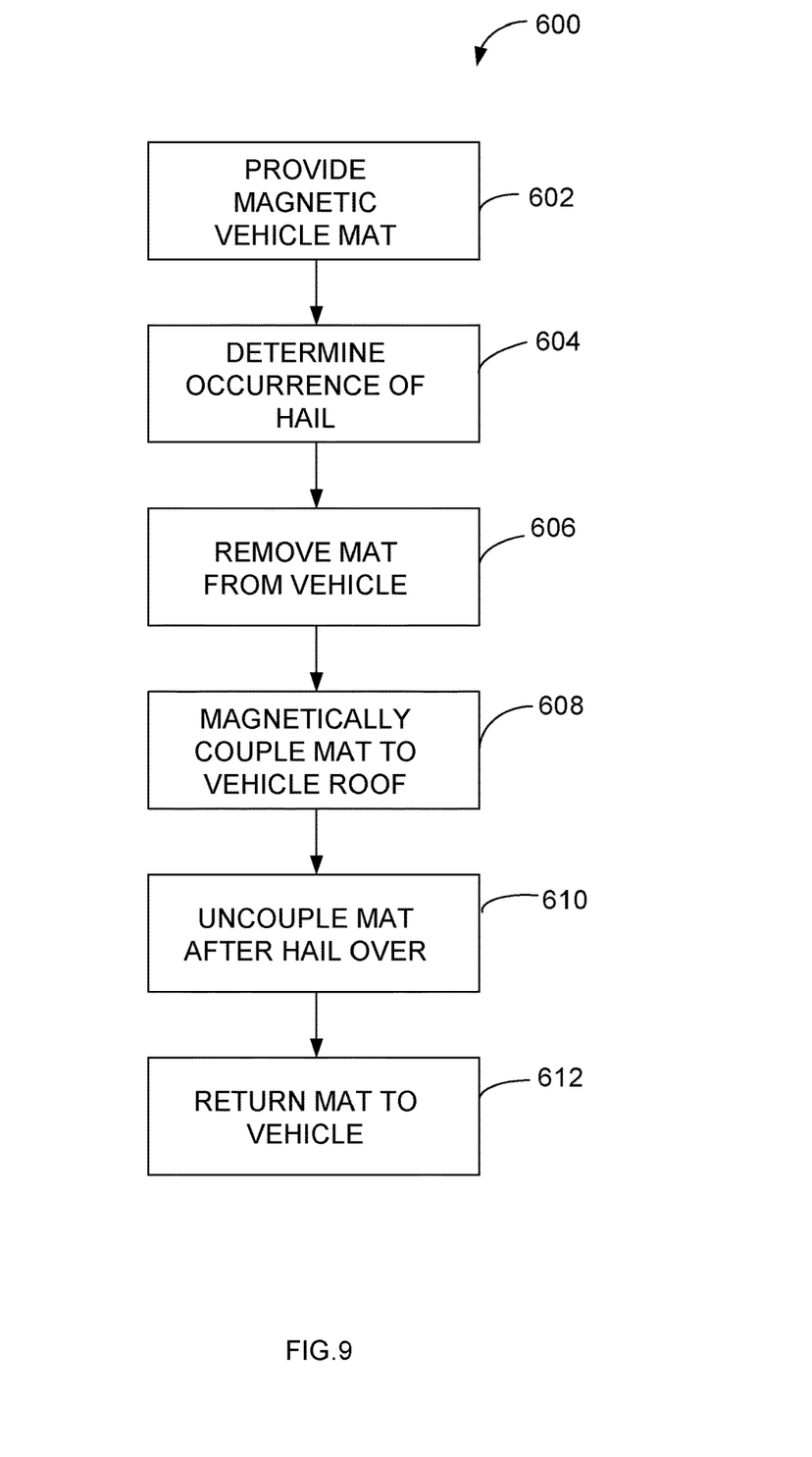
FIG. 9 is a flow diagram illustrating one example of a method for using the magnetic vehicle floor mats.

FIG. 9 illustrates one example of a method 600. In step 602, a magnetic vehicle mat is provided. The magnetic vehicle may be may of any of the types shown and described herein or may otherwise provide for magnetically coupling to a roof of a vehicle. The vehicle mats may be sold with the vehicle or may be provided as an after market accessory. A magnetic vehicle mat is provided or obtained if it is made available to a driver or vehicle operator of the vehicle. For example, the vehicle mat is provided if it is installed in a vehicle or made available within the vehicle.

In step 604 a determination is made that a hailstorm will occur or is likely to occur. This determination can be made in any number of ways. For example, this determination may be made by observing that hail is falling, observing hail on the side of the road, observing that vehicles approaching from the opposite direction are covered in hail, or observing the presence of clouds indicative of hail. This determination may also be determined based on weather forecasts or weather alerts indicating the occurrence of hail or a prediction for the occurrence of hail such as may be provided via television broadcast, radio broadcast, mobile app notifications, text messages, or otherwise.

In step 606, one or more mats are removed from the vehicle. Generally, such mats may be in the form of floor mats which are positioned in the manner typical of vehicle floor mats such that a driver's feet or passenger's feet may rest on the vehicle floor mats. Such mats may also be in the form of cargo mats which may be positioned to rest in a cargo area such that cargo may rest on the cargo mat.

In step 608, after the one or more mats are removed from the vehicle the one or more mats are magnetically coupled to the vehicle roof. Thus, the magnetic portion of the mats may contact with the vehicle roof with sufficient magnetic force to maintain the mats in position while the vehicle travels at a normal rate of speed and during a hail event. Preferably the number and size of the mats are sufficient to fully cover at least the vehicle roof. The number and size of mats may also allow for covering all or a portion of the vehicle trunk and/or hood or other vulnerable portions of the vehicle which would not impede vehicle operation. In situations such as when the vehicle is parked, it is contemplated that sheets, blankets, or other materials may be used such as by draping a sheet or blanket down a side of the vehicle and using the magnetic mat over a portion of the sheet or blanket to assist in securing the sheet or blanked. The magnetic force provided by the mats should be sufficient to magnetically couple to the vehicle through the blanket, sheet, or other material.

In step 610, after the hailstorm or event is over, the one or more mats may be magnetically uncoupled from the vehicle. Then, in step 612, the one or more mats may be returned to the vehicle. For example, if the one or more mats include floor mats, the floor mats may be positioned on the floor of the vehicle in the appropriate locations. If the one or more mats include a cargo mat, the cargo mat may be returned to the cargo area.

The methodology shown is advantageous as it provides for increased protection of a vehicle during a hail event. Because the vehicle mats are normally present in a car and serve a functional role within the vehicle, providing a secondary purpose for the vehicle mats is advantageous to the vehicle owner and/or driver. Where the vehicle mats are used in this way, the likelihood of paint or vehicle body damage from hail is reduced. Thus, others may benefit from the provision and use of the mats including insurance companies providing insurance coverage which covers hail damage. It is also to be understood, that the vehicle mats may be useful to automotive dealers, vehicle rental companies, and others who have inventories of vehicles or fleets of vehicles.

It should further be understood that the present invention numerous options, variations, and alternatives. For example, the vehicle mats may be sized and shaped to serve as a floor mat fitting to the floorboards of a vehicle. However, the vehicle mats may be alternatively sized and shaped to fit to a cargo area, trunk area, or bed area or to other compartments of the vehicle. It should further be understood that the size and shape of the mats may be specific to a make and model of vehicle in which it is used. It should also be understood that the mats may have different textures. In addition to texture, the mats may also have various types of surface ornamentation. This may include branding such as printing indicating the source of the mat such as the manufacturer of the mat, a dealership who provided the mats, an insurance company, or otherwise. It should also be understood that the surface ornamentation may be printed on the mat and may be customized according to the preferences of the vehicle owner. Although specific materials have been discussed throughout, the present invention contemplates that other types of materials may be used. The present invention is not to be limited to the specific embodiments and descriptions.

What is claimed is:

1. A vehicle mat configured to prevent hail damage to a body of a vehicle, the vehicle mat comprising:
    a vehicle mat body having a plurality of layers including a top layer and a bottom layer, wherein the top layer is adhered to the bottom layer;
    the top layer comprised of a hail resistant material;
    the bottom layer comprised of a flexible magnetic substrate wherein the flexible magnetic substrate provides sufficient holding strength to magnetically couple the vehicle mat to the body of the vehicle and maintain the vehicle mat in place during a hail event to thereby assist in preventing hail damage to the vehicle;
    wherein the vehicle mat is a vehicle floor mat and wherein the vehicle mat body is sized and shaped to fit a floorboard of the vehicle.

2. The vehicle mat of claim 1 wherein the flexible magnetic substrate comprises a magnetized polymer composite.

3. The vehicle mat of claim 2 wherein the flexible magnetic substrate has a pull strength of at least 41.5 g/cm$^2$.

4. The vehicle mat of claim 1 wherein the floorboard is in a first row of the vehicle.

5. The vehicle mat of claim 1 wherein the floorboard is in a second row of the vehicle.

6. The vehicle mat of claim 1 wherein the top layer comprises vinyl.

7. The vehicle mat of claim 1 wherein the top layer comprises a textured surface.

8. The vehicle mat of claim 1 wherein the flexible magnetic substrate comprises an elastomeric polymer and a ferrite material formed into a sheet and magnetized.

9. The vehicle mat of claim 8 wherein the top layer comprises carpeting.

10. A method for preventing hail damage to a vehicle, the method comprising:
    providing a vehicle mat configured to prevent hail damage to a body of the vehicle, the vehicle mat comprising: a vehicle mat body having a plurality of layers including a top layer and a bottom layer with the top layer adhered to the bottom layer, the top layer comprised of a hail resistant material, the bottom layer comprised of a flexible magnetic substrate wherein the flexible magnetic substrate provides sufficient holding strength to magnetically couple the vehicle mat to a side of a vehicle body and maintain the vehicle mat in place during a hail event to thereby assist in preventing hail damage to the vehicle;
    removing the vehicle mat from the vehicle prior or during a hailstorm;
    magnetically coupling the vehicle mat to an exterior of the vehicle body so as to assist in preventing hail damage to the vehicle such that the bottom layer is in contact with the exterior of the vehicle body;
    during the hailstorm receiving hail at the top layer of the vehicle mat with the vehicle mat absorbing impact from the hail to prevent damage to the exterior of the vehicle body while the flexible magnetic substrate of the bottom layer of the vehicle mat remains magnetically coupled to the exterior of the vehicle body to maintain the vehicle mat in place on the exterior of the vehicle body;
    magnetically decoupling the vehicle mat from the exterior of the vehicle body after the hailstorm.

11. The method of claim 10 further comprising returning the vehicle into the vehicle.

12. The method of claim 10 wherein the flexible magnetic substrate comprises a magnetized polymer composite.

13. The method of claim 12 wherein the flexible magnetic substrate has a pull strength of at least 41.5 g/cm².

14. The method of claim 10 wherein the vehicle mat is a vehicle floor mat and wherein the vehicle mat body is sized and shaped to fit a floorboard of the vehicle.

15. The method of claim 10 wherein the vehicle mat is a vehicle cargo mat and wherein the vehicle mat body is sized and shaped to fit a cargo area of the vehicle.

16. The method of claim 10 wherein the top layer comprises vinyl.

17. The method of claim 10 wherein the top layer comprises a textured surface.

18. The method of claim 10 wherein the flexible magnetic substrate comprises an elastomeric polymer and a ferrite material formed into a sheet and magnetized.

19. A system comprising a plurality of vehicle mats configured to prevent hail damage to a body of a vehicle, the system comprising:
  a vehicle floor mat comprising: a vehicle floor mat body having a plurality of integrated layers including a top layer and a bottom layer, the vehicle floor mat body sized and shaped to fit a floorboard of the vehicle;
  the top layer comprised of a hail resistant material;
  the bottom layer comprised of a flexible magnetic substrate wherein the flexible magnetic substrate provides sufficient holding strength to magnetically couple the vehicle mat to a side of the vehicle body and maintain the vehicle mat in place during a hail event to thereby assist in preventing hail damage to the vehicle;
  wherein the flexible magnetic substrate comprises a magnetized polymer composite;
a vehicle cargo mat comprising:
  a vehicle cargo mat body having a plurality of integrated layers including a top layer and a bottom layer, the vehicle cargo mat body sized and shaped to fit a cargo area of the vehicle;
  the top layer comprised of a hail resistant material;
  the bottom layer comprised of a flexible magnetic substrate wherein the flexible magnetic substrate provides sufficient holding strength to magnetically couple the vehicle mat to the side of the vehicle body and maintain the vehicle mat in place during a hail event to thereby assist in preventing hail damage to the vehicle;
  wherein the flexible magnetic substrate comprises a magnetized polymer composite.

20. The system of claim 19 further comprising:
the flexible magnetic substrate of the vehicle floor mat has a pull strength of at least 41.5 g/cm²;
the flexible magnetic substrate of the vehicle cargo mat has a pull strength of at least 41.5 g/cm²;
the top layer of the vehicle floor mat comprises carpeting; and
the top layer of the vehicle carbo mat comprises carpeting.

* * * * *